United States Patent
Liu et al.

(10) Patent No.: US 10,768,881 B2
(45) Date of Patent: Sep. 8, 2020

(54) MULTI-SCREEN INTERACTION METHOD AND SYSTEM IN AUGMENTED REALITY SCENE

(71) Applicant: TENCENT TECHNOLOGY (SHENZHEN) COMPANY LIMITED, Shenzhen (CN)

(72) Inventors: Keqing Liu, Shenzhen (CN); Wenhao Zhang, Shenzhen (CN); Libo Li, Shenzhen (CN); Zhizhi Zhou, Shenzhen (CN); Zelong Deng, Shenzhen (CN); Xueyu Wang, Shenzhen (CN); Mengcheng Zhang, Shenzhen (CN); Xikun Yang, Shenzhen (CN); Zhihui Wang, Shenzhen (CN); Chao Yang, Shenzhen (CN); Shuya Feng, Shenzhen (CN); Huamei Yang, Shenzhen (CN); Jing Xu, Shenzhen (CN); Xin Li, Shenzhen (CN); Fangji Zhang, Shenzhen (CN); Xiao Xiao, Shenzhen (CN); Xicheng Liu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/374,559

(22) Filed: Apr. 3, 2019

(65) Prior Publication Data

US 2019/0227764 A1 Jul. 25, 2019

Related U.S. Application Data

(63) Continuation of application No. PCT/CN2017/111615, filed on Nov. 17, 2017.

(30) Foreign Application Priority Data

Dec. 13, 2016 (CN) .......................... 2016 1 1147184

(51) Int. Cl.
*G06F 3/14* (2006.01)
*G06F 3/0488* (2013.01)
(Continued)

(52) U.S. Cl.
CPC ............ *G06F 3/1423* (2013.01); *G06F 3/011* (2013.01); *G06F 3/0304* (2013.01);
(Continued)

(58) Field of Classification Search
CPC combination set(s) only.
See application file for complete search history.

(56) References Cited

U.S. PATENT DOCUMENTS

2012/0263154 A1* 10/2012 Blanchflower ......... H04L 67/38
370/338
2014/0267404 A1* 9/2014 Mitchell ............... G06T 19/006
345/633
2015/0269779 A1* 9/2015 Wong ................... H04N 13/344
345/633

FOREIGN PATENT DOCUMENTS

CN 102147658 A 10/2011
CN 104536763 A 4/2015
(Continued)

OTHER PUBLICATIONS

International Search Report dated Feb. 22, 2018 in International Application No. PCT/CN2017/111615 with English Translation.
(Continued)

*Primary Examiner* — Deeprose Subedi
(74) *Attorney, Agent, or Firm* — Oblon, McClelland, Maier & Neustadt, L.L.P.

(57) ABSTRACT

A method for a multi-screen interaction system for an augmented reality scene, information processing devices,
(Continued)

---

101 — A first terminal displays a resource object in an AR scene, where an AR marker is embedded in the resource object 102 — In a process that the first terminal displays the resource object, a second terminal obtains the AR marker embedded in the resource object from the first terminal through a communication connection 103 — The second terminal displays an AR effect in the AR scene based on the AR marker and a non-transitory computer-readable storage medium are provided. In the method, a resource object of the augmented reality scene, in which an augmented reality marker is embedded, is displayed. An augmented reality effect play message is received from a second device of the multi-screen interaction system for the augmented reality scene through a communication connection. An augmented reality resource associated with the augmented reality effect play message is displayed in response to the received augmented reality effect play message.

20 Claims, 3 Drawing Sheets

(51) Int. Cl.
*G06K 7/10* (2006.01)
*G06K 7/14* (2006.01)
*G06K 9/00* (2006.01)
*G06F 3/01* (2006.01)
*G06F 3/0484* (2013.01)
*G06K 9/20* (2006.01)
*G06F 3/03* (2006.01)

(52) U.S. Cl.
CPC .......... *G06F 3/0484* (2013.01); *G06F 3/0488* (2013.01); *G06F 3/14* (2013.01); *G06K 7/10722* (2013.01); *G06K 7/1417* (2013.01); *G06K 9/00671* (2013.01); *G06K 9/2063* (2013.01)

(56) References Cited

FOREIGN PATENT DOCUMENTS

CN 104575142 A 4/2015
CN 106200944 A 7/2016

OTHER PUBLICATIONS

Written Opinion dated Feb. 22, 2018 in International Application No. PCT/CN2017/111615.

* cited by examiner

MULTI-SCREEN INTERACTION METHOD AND SYSTEM IN AUGMENTED REALITY SCENE

RELATED APPLICATION

This application is a continuation of International Application No. PCT/CN2017/111615, filed on Nov. 17, 2017, which claims priority to Chinese Patent Application No. 201611147184X, filed on Dec. 13, 2016. The entire disclosures of the prior applications are hereby incorporated by reference in their entirety.

FIELD OF THE TECHNOLOGY

The present disclosure relates to the field of computer technologies for a multi-screen interaction method and system in an AR scene.

BACKGROUND OF THE DISCLOSURE

Augmented Reality (AR) is a technology that calculates a location and an angle of a camera and adds a corresponding image, video, and 3D model in real time. An objective of the technology is to superimpose a virtual world on the real world on a screen and perform an interaction. As an operational capability of a portable electronic product is increased, the AR will be more widely applied.

In the related technology, in an AR scene, a user enters data by using a device such as a keyboard or a mouse, and after the user enters the data, an AR head-mounted device collects the user data, and displays a playback effect by using a screen of the device. In the related technology, one user is allowed to use an AR hamlet to perform a personal service, but a multi-screen interaction between multiple terminal devices in the AR scene cannot be implemented.

SUMMARY

The present disclosure discloses a multi-screen interaction method and system in an AR scene for a multi-screen interaction between a plurality of terminal devices in the AR scene.

In one aspect, there is provided a method. For example, the method is performed by processing circuitry of a first and a second device of a multi-screen interaction system for an augmented reality scene. A resource object of the augmented reality scene, in which an augmented reality marker is embedded, is displayed. An augmented reality effect play message is received from the second device of the multi-screen interaction system for the augmented reality scene through a communication connection. An augmented reality resource associated with the augmented reality effect play message is displayed in response to the received augmented reality effect play message.

In one embodiment, the displaying the resource object of the augmented reality scene includes that one of an application and a web page of a browser is used to display the resource object of the augmented reality scene, in which the augmented reality marker is embedded.

In one embodiment, a touch-and-hold identification request is sent through the communication connection to the second device after a display screen of the first device is touched. The touch-and-hold identification request is received by the second device from the first device through the communication connection after the display screen of the first device is touched. The augmented reality marker embedded in the resource object is captured by the second device from the display screen of the first device when the touch-and-hold identification request is received. The augmented reality effect play message is sent by the second device to the first device through the communication connection. The augmented reality resource corresponding to the augmented reality marker is obtained by the second device. An augmented reality effect corresponding to the augmented reality resource is displayed by the second device on a display screen of the second device.

In one embodiment, a camera is used by the second device to scan or photograph a display screen of the first device, to capture the augmented reality marker embedded in the resource object from the first device. The augmented reality effect play message is sent to the first device through the communication connection by the second device. The augmented reality resource corresponding to the augmented reality marker is obtained by the second device. An augmented reality effect corresponding to the augmented reality resource is displayed by the second device on a display screen of the second device In one aspect, there is provided a device for interacting with a second device for a multi-screen interaction system for an augmented reality scene. The device includes interface circuitry configured to transmit and receive signals carrying media data to and from the second device through a communication connection. The device includes processing circuitry configured to display a resource object of the augmented reality scene, in which an augmented reality marker is embedded, to receive an augmented reality effect play message corresponding to augmented reality marker from the second device through the communication connection, and to display an augmented reality resource associated with the augmented reality effect play message in response to the received augmented reality effect play message. The augmented reality marker causes the second device to display an augmented reality effect of the augmented reality scene corresponding to the augmented reality resource when the augmented reality marker is captured by the second device from the displayed resource object. The displaying the resource object of the augmented reality scene, in which the augmented reality marker is embedded, includes that one of an application or a web page of a browser is used to display the resource object of the augmented reality scene, in which the augmented reality marker is embedded. The processing circuitry is further configured to send a touch-and-hold identification request to the second device through the communication connection when a display screen of the device is touched. The augmented reality marker embedded in the resource object from the display screen of the device is captured by the second device when the touch-and-hold identification request is received by the second device through the communication connection. The augmented reality effect play message is sent by the second device through the communication connection to the device when the second device obtains the augmented reality resource corresponding to the augmented reality marker.

In one embodiment, the augmented reality marker embedded in the resource object from a display screen of the device is captured by the second device by using a camera to scan or photograph the display screen of the device. The augmented reality effect play message is sent by the second device through the communication connection to the device when the second device obtains the augmented reality resource corresponding to the augmented reality marker.

In one embodiment, the second device is an augmented reality head-mounted device.

In one embodiment, a display screen of the device or a display screen of the second device is a touch screen.

In one aspect, a non-transitory computer-readable storage medium is provided. The non-transitory computer-readable storage medium storing instructions which when executed by at least one processor cause the at least one processor to perform receiving an augmented reality effect play message corresponding to augmented reality marker from a second device through the communication connection and displaying an augmented reality resource associated with the augmented reality effect play message in response to the received augmented reality effect play message. The augmented reality marker causes the second device to display an augmented reality effect of the augmented reality scene corresponding to the augmented reality resource when the augmented reality marker is captured by the second device from the displayed resource object.

In some embodiments, there are provided a non-transitory computer-readable storage medium storing instructions which when executed by at least one processor cause the at least one processor to perform any of the methods described above.

In the embodiments of the present disclosure, the multi-screen interaction system in an AR scene includes the first terminal device and the second terminal device between which a communication connection is established. The first terminal device embeds an AR marker in a resource object, and the AR marker is displayed on a screen of the first terminal device. In a process that the first terminal device displays the resource object, the second terminal device captures the AR marker embedded in the resource object from the first terminal device through the communication connection, so that the second terminal device displays an AR effect in the AR scene based on the AR marker. In the embodiments of the present disclosure, the AR effect displayed on the second terminal device is triggered by the AR marker displayed in the first terminal device. Therefore, in the embodiments of the present disclosure, a multi-screen interaction between the screen of the first terminal device and a screen of the second terminal device can be implemented, satisfying a request of a user on the multi-screen interaction in the AR scene.

BRIEF DESCRIPTION OF THE DRAWINGS

To more explicitly explain technical solutions in embodiments of the present disclosure, accompanying drawings needed in describing the embodiments are briefly introduced in the following. The following accompanying drawings are some embodiments of the present disclosure, and persons skilled in the art can derive other accompanying drawings from the accompanying drawings.

DESCRIPTION OF EMBODIMENTS

Figure 1:
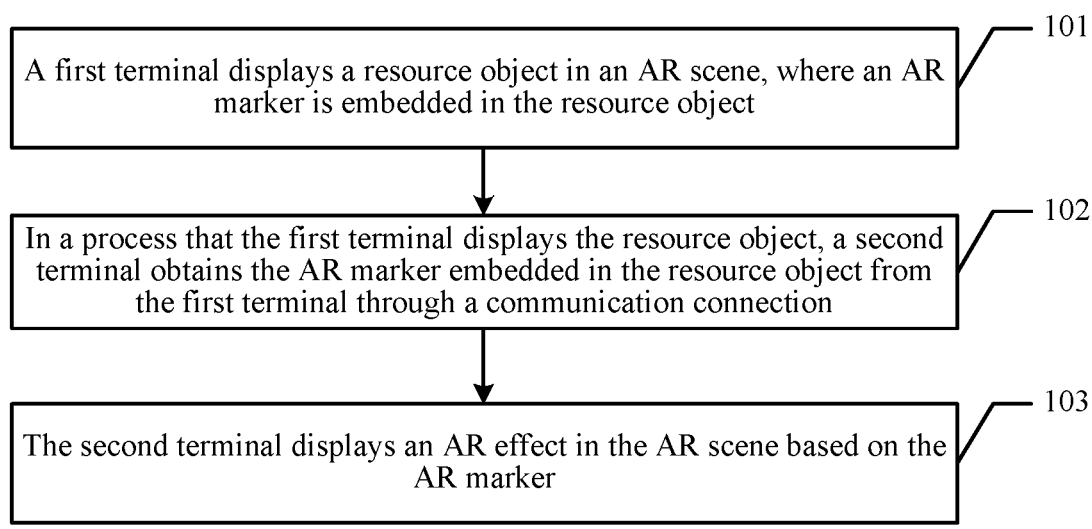
FIG. 1 is a schematic block diagram of a process of a multi-screen interaction method in an AR scene according to an embodiment of the present disclosure.

Embodiments of the present disclosure provide a multi-screen interaction method and system in an AR scene, to implement a multi-screen interaction between a plurality of terminal devices in the AR scene.

In order to make objectives, characteristics, and advantages of the present disclosure more clear and comprehensible, the technical solutions in the embodiments of the present disclosure will be clearly described in the following with reference to the accompanying drawings in the embodiments of the present disclosure. The embodiments to be described below are some rather than all of the embodiments of the present disclosure. All other embodiments obtained by persons of ordinary skill in the art based on the embodiments of the present disclosure shall fall within the protection scope of the present disclosure.

In the specification, claims, and the foregoing drawings, the terms "include", "have" and any other variants mean to cover the non-exclusive inclusion, so that a process, method, system, product, or device that includes a series of units is not limited to those units, but may include other units not expressly listed or inherent to such a process, method, system, product, or device.

The multi-screen interaction method in an AR scene provided in the embodiments of the present disclosure may be applied to a multi-screen interaction system in an AR scene. The multi-screen interaction system in the AR scene includes a first terminal device and a second terminal device between which a communication connection is established. It may be understood that the multi-screen interaction system provided in the embodiments of the present disclosure includes two types of terminal devices, where the terminal devices are respectively defined as the first terminal device and the second terminal device. It is not limited that, in the embodiments of the present disclosure, more terminal devices may be included, for example, three or more terminal devices. In the multi-screen interaction system, the first terminal device is a terminal device for displaying an AR marker, and the second terminal device is a terminal device for displaying an AR effect. Multi-screen interaction between the two terminal devices in the AR scene may be implemented, to satisfy a request of a user on a multi-screen interaction between a plurality of terminal devices in the AR scene. The terminal device included in the multi-screen interaction system provided in the embodiments of the present disclosure may be a terminal device such as a mobile terminal device or a personal computer. For example, the terminal device may be specifically an AR head-mounted device. The AR head-mounted device is a mobile terminal device, and has various traits of the mobile terminal device. Various modules of the mobile terminal device may be disposed in the AR head-mounted device, so that the AR head-mounted device has a complete communication and interaction function.

It is understood that, in the present disclosure, the first terminal device may be a personal computer (PC) or computing device, and the second terminal device may be a mobile phone; alternatively, the first terminal device may be a mobile phone, and the second terminal device may be a PC; alternatively, both the first terminal device and the second terminal device may be PCs; alternatively, both the first terminal device and the second terminal device may be mobile phones. It is noted that, during actual application, the first terminal device and the second terminal device may alternatively be other terminal devices such as tablet computers, notebook computers, palmtop computers, or other intelligent terminal devices. This is not limited herein.

Specifically, referring to FIG. 1, a multi-screen interaction method in an AR scene provided in an embodiment of the present disclosure is applied to a multi-screen interaction system in an AR scene. The multi-screen interaction system in the AR scene includes a first terminal device and a second terminal device between which a communication connection is established, and the multi-screen interaction method in the AR scene includes the following steps:

101: The first terminal device displays a resource object in the AR scene, where an AR marker is embedded in the resource object.

In this embodiment of the present disclosure, the first terminal device in the multi-screen interaction system has a screen, and the resource object in the AR scene is first displayed on the screen of the first terminal device. The resource object in the AR scene is displayed on the screen of the first terminal device. In this embodiment of the present disclosure, the AR scene may be specifically an AR game scene or an AR social scene, or may be an AR operation scene of an APP, for example, an AR application operation scene of office software or an AR application operation scene of a role. For another example, the AR scene may be an AR animation play scene. The resource object may be various implementation objects or role objects. For example, the resource object may be an animation resource played in the AR scene, or a role object controlled by a user in an AR game scene, or an item object. This is not limited herein. In this embodiment of the present disclosure, to implement a multi-screen interaction, the AR marker is embedded in the resource object. The AR marker may be an AR mark disposed in the resource object, or an AR mark carried in and displayed on the resource object. The AR marker may be a marker woken up by using AR, and is commonly an image, an object, a two-dimensional barcode, an item, and the like that have unique texture and are easily identified. The AR marker may be used to trigger an AR effect of another terminal device under the multi-screen interaction. The AR effect is an AR resource playback effect displayed by a terminal device in the AR scene, for example, may be an animation playback effect or a 3D display effect. This is not limited herein.

It is noted that, in this embodiment of the present disclosure, the communication connection is established between the first terminal device and the second terminal device. For example, the communication connection is established between the first terminal device and the second terminal device by using a mobile network, Bluetooth, or Wi-Fi. For another example, both the first terminal device and the second terminal device are connected to a same background system. Both the first terminal device and the second terminal device are connected to the background system, and the first terminal device and the second terminal device each establish a long connection channel or a polling channel with the background system. Therefore, communication between the first terminal device or the second terminal device and the background system is maintained by using a long connection signal or a polling signal. A cycle design of a heartbeat packet may be implemented in combination with an application scenario. This is not limited herein.

In some embodiments of the present disclosure, step 101 that the first terminal device displays a resource object in the AR scene includes:

A1. running, by the first terminal device, an APP, to display the resource object embedded with the AR marker on a display interface of the APP; or A2. displaying, by the first terminal device by using a web page of a browser, the resource object embedded with the AR marker.

Various APPs may be installed on the first terminal device, and the AR marker may be displayed to the user by using the resource object displayed on the display interface of the APP, so that the AR marker is presented by using the display interface of the APP. For example, the APP may be an animation playback program, or a picture display program. For example, the user may perform an operation on the APP of the first terminal device. When a resource object is displayed on the APP, the AR marker may be embedded in the resource object. In this case, the second terminal device may be used to capture the AR marker. The second terminal device displays the AR effect, thereby implementing a multi-screen interaction between the first terminal device and the second terminal device. For another example, the browser may alternatively be installed on the first terminal device. Therefore, the resource object may be alternatively displayed on the web page. The AR marker may be embedded in the resource object displayed on the web page. For example, when the user browses web pages by using the browser of the first terminal device and browses a resource object on the web page, the AR marker may be embedded in the resource object. In this case, the second terminal device may be used to capture the AR marker. The second terminal device displays the AR effect, thereby implementing a multi-screen interaction between the first terminal device and the second terminal device.

The web page may be specifically a Hyper Text Markup Language (HTML) 5 web page. Hypertext means that a page may include non-text elements such as a picture, a link, music, and a program.

102. In a process that the first terminal device displays the resource object, the second terminal device captures the AR marker embedded in the resource object from the first terminal device through the communication connection.

In this embodiment of the present disclosure, after the resource object is displayed on the screen of the first terminal device, the resource object embedded with the AR marker may be displayed in real time, or the resource object may be displayed in real time but the AR marker is displayed in a display trigger condition. Because the communication connection is established between the first terminal device and the second terminal device, in the process that the first terminal device displays the resource object, the second terminal device may communicate with the first terminal device through the communication connection, so that the second terminal device may capture the AR marker embedded in the resource object from the first terminal device. After the AR marker is identified by the second terminal device, step 103 may be triggered to be performed. In this case, the first terminal device may still display the foregoing resource object. After the second terminal device captures the AR marker, the AR marker embedded in the resource object that is displayed on the display screen of the first terminal device may be continuously displayed, or concealed, which may be implemented in combination with an application scenario.

In some embodiments of the present disclosure, in step 102, the second terminal device capturing the AR marker embedded in the resource object from the first terminal device through the communication connection includes:

B1. scanning or photographing, by the second terminal device, a display screen of the first terminal device by using a camera, to capture the AR marker embedded in the resource object.

The AR marker may be an image or two-dimensional barcode information. Therefore, the camera on the second terminal device may be configured to capture the AR marker. An example is described as follows. The second terminal device may be an AR head-mounted device, and usually has an optical camera and an infrared camera. The optical camera may be configured to photograph a natural object. However, because the infrared camera uses an infrared feature, the infrared camera can enhance an image capture capability by penetrating body tissue, and especially, enhance a capability of capturing an image at night. The AR marker captured by the second terminal device may have various representations. For example, the AR marker may be a role object or an object.

In some other embodiments of the present disclosure, in step 102, the second terminal device capturing the AR marker embedded in the resource object from the first terminal device through the communication connection includes:

C1. obtaining, by the second terminal device, a touch-and-hold identification request sent after the display screen of the first terminal device is touched; and C2. receiving, by the second terminal device, the touch-and-hold identification request through the communication connection, and capturing the AR marker embedded in the resource object from the display screen of the first terminal device based on the touch-and-hold identification request.

The first terminal device may display the resource object by using the display screen. When the AR marker embedded in the resource object is displayed on the display screen of the first terminal device, the user may touch the display screen of the first terminal device. For example, when the user touches the display screen of the first terminal device for a long time of 3 s, the first terminal device may obtain the touch-and-hold identification request delivered by the user by touching the display screen, and the first terminal device sends the touch-and-hold identification request to the second terminal device through the communication connection with the second terminal device. For example, after the first terminal device detects the touch-and-hold identification request delivered by the user by touching the display screen, the first terminal device sends the touch-and-hold identification request to the second terminal device. The second terminal device may receive the touch-and-hold identification request through the communication connection, and capture the AR marker embedded in the resource object from the display screen of the first terminal device based on the touch-and-hold identification request. For example, the second terminal device turns on the camera of the second terminal device based on the touch-and-hold identification request, to scan the AR marker displayed on the screen of the first terminal device.

103. The second terminal device displays an AR effect in the AR scene based on the AR marker.

In this embodiment of the present disclosure, in the process that the first terminal device displays the resource object, after the second terminal device captures the AR marker from the first terminal device, the second terminal device may parse the AR marker, and determine that the AR effect needing to be displayed is obtained from a local storage of the second terminal device, to obtain the AR effect displayed on a screen of the second terminal device after the AR effect is triggered by the AR marker, so that the first terminal device and the second terminal device can implement a multi-screen interaction based on the AR marker.

In some embodiments of the present disclosure, after step 102, the second terminal device capturing the AR marker embedded in the resource object from the first terminal device through the communication connection further includes the following steps:

D1. sending, by the second terminal device, an AR effect play message to the first terminal device through the communication connection;

D2. obtaining, by the first terminal device, the AR effect play message of the second terminal device through the communication connection; and D3. displaying, by the first terminal device based on the AR effect play message of the second terminal device, an AR resource associated with the AR effect.

In this embodiment of the present disclosure, after the second terminal device captures, from the first terminal device, the AR marker displayed on the display screen of the first terminal device, the second terminal device may further feedback, to the first terminal device, whether an acknowledgement message of the AR marker is received. Before the second terminal device displays the AR effect in the AR scene, the second terminal device sends the AR effect play message to the first terminal device, and the first terminal device obtains the AR effect play message of the second terminal device, so that the first terminal device may learn of that the second terminal device captures the AR marker, and the second terminal device is about to play the AR effect. The first terminal device may display the AR resource associated with the AR effect based on the AR effect play message of the second terminal device. That is, the first terminal device and the second terminal device may synchronously play the AR resource, so that the screen of the first terminal device and the screen of the second terminal device can display the associated AR resource and the AR effect. For example, the second terminal device receives the AR marker of the first terminal device, and the second terminal device sends, to the first terminal device, a reminder message that the AR effect is about to be played. The first terminal device starts playing the animation resource after receiving the reminder message, to synchronously play the AR effect with the second terminal device.

In some embodiments of the present disclosure, step 103 that the second terminal device displays an AR effect in the AR scene based on the AR marker includes:

E1. capturing, by the second terminal device, the AR resource based on the AR marker; and E2. displaying, by the second terminal device, an AR effect corresponding to the AR resource on a screen of the second terminal device.

In the foregoing embodiment of the present disclosure, a quantity of and a type of AR markers do not need to be limited, as long as the AR effect of the second terminal device can be woken up. The second terminal device may obtain the AR resource corresponding to the AR marker based on the AR marker. For different AR markers, the second terminal device may obtain different AR resources, where an AR resource may be an animation resource, a game resource, an art resource, or the like that is triggered by an AR marker. For example, the second terminal device configures AR resources corresponding to a plurality of AR markers in an installed APP. When the second terminal device captures an AR marker from the first terminal device, the second terminal device may obtain the AR resource from the APP. For another example, a communication connection is established between the second terminal device and an AR resource server. When the second terminal device captures an AR marker from the first terminal device, the second terminal device interacts with the AR resource server by using the AR marker. The second terminal device may obtain the AR resource corresponding to the AR marker from the AR resource server. For another example, the second terminal device prestores AR resources corresponding to a plurality of AR markers in the local storage. An AR resource is displayed on the screen of the second terminal device, so that an AR effect corresponding to each AR marker may be implemented. For example, the AR effect is an animation effect, a 3D effect, or the like.

It may be learned from descriptions of the foregoing embodiments of the present disclosure that, the multi-screen interaction system in an AR scene includes the first terminal device and the second terminal device between which a communication connection is established. The first terminal device embeds an AR marker in a resource object, and the AR marker is displayed on a screen of the first terminal device. In a process that the first terminal device displays the resource object, the second terminal device captures the AR marker embedded in the resource object from the first terminal device through the communication connection, so that the second terminal device displays an AR effect in the AR scene based on the AR marker. In this embodiment of the present disclosure, the AR effect displayed on the second terminal device is triggered by the AR marker displayed in the first terminal device. Therefore, in this embodiment of the present disclosure, a multi-screen interaction between the screen of the first terminal device and a screen of the second terminal device can be implemented, satisfying a request of a user on the multi-screen interaction in the AR scene.

For ease of better understanding and implementing the foregoing solution in the embodiment of the present disclosure, specific descriptions are provided below by using an example of a corresponding application scenario.

An embodiment of the present disclosure provides a multi-screen interaction method implemented by using a multi-screen interaction system in an AR scene. The multi-screen interaction system includes a first terminal device and a second terminal device, where the first terminal device is a PC terminal device, and the second terminal device is a mobile terminal device. The multi-screen interaction system provided in this embodiment of the present disclosure can implement interaction between screens such as a PC screen and a screen of the mobile terminal device (for example, a mobile phone or a tablet computer).

Figure 2:
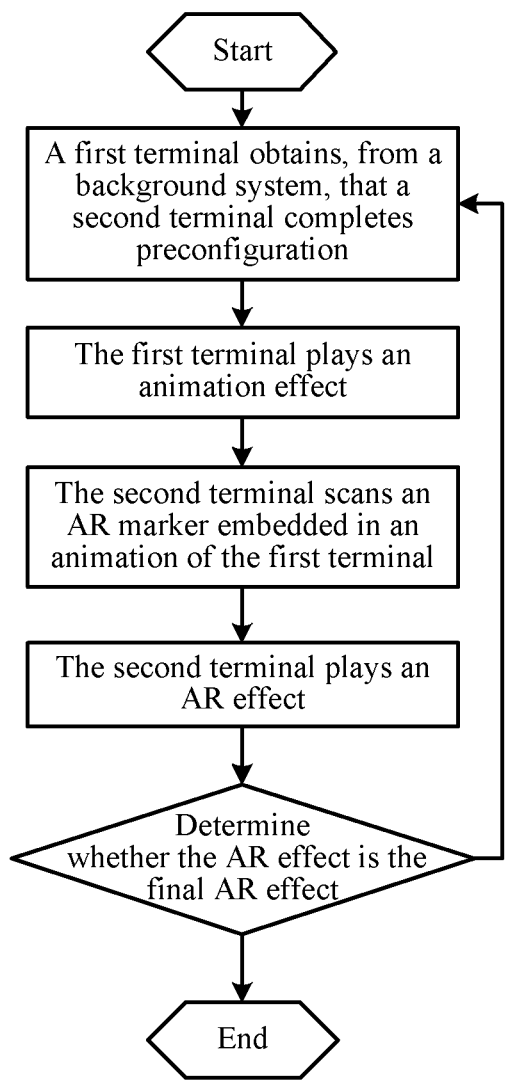
FIG. 2 is a schematic diagram of a multi-screen interaction process of an AR effect in an AR scene according to an embodiment of the present disclosure.

Referring to FIG. 2, FIG. 2 is a schematic diagram of a multi-screen interaction process of an AR effect in an AR scene according to an embodiment of the present disclosure. In this embodiment of the present disclosure, a screen of a terminal device first performs presentation, for example, animation playback or a first frame of an animation on a PC terminal device. An example in which the PC terminal device first performs presentation is used for description, and screens of other terminal devices can be similarly used for description. Associated presentation on a screen of another terminal device is triggered after the presentation is performed to a time or a user completes some interactions. For example, an example in which a second terminal device is a mobile terminal device is used for description, and other screens are similar. The interaction method provided in this embodiment of the present disclosure has excellent interactivity, for example, implements AR scanning of a plurality of AR markers and animation trigger, so that more novel user experience may be provided. In this embodiment of the present disclosure, a multi-screen interaction between a first terminal device and the second terminal device may be implemented. The multi-screen interaction is applicable to a product having two forms, an APP of a mobile phone and a web page of the PC. A status change of the web page of the PC terminal device is controlled by using AR, and a status change of the APP of the mobile phone is controlled by using the AR.

In some embodiments of the present disclosure, the first terminal device and the second terminal device each maintain a long connection with a background system. For example, both the first terminal device and the second terminal device maintain a polling signal of a same background system with the background system. Then, the second terminal device starts identification and scanning, and the first terminal device starts to play a first frame of an animation. For example, the second terminal device enables a camera and starts identification and scanning, and the first frame of the animation is first played on a screen of the first terminal device. The second terminal device further needs to be configured with the following logic: after an AR animation starts, if a result is returned to the background system after the AR animation ends. That is, the second terminal device stores the AR animation in a local storage, and returns the result to the background system after the AR animation ends. After completing the foregoing preconfiguration process, the first terminal device and the second terminal device start to perform the process shown in FIG. 2, and the process mainly includes the following steps:

Step 201. The first terminal device obtains, from the background system, that the second terminal device completes preconfiguration.

The first terminal device communicates with the second terminal device by using a long connection signal, and the first terminal device obtains that the second terminal device completes the foregoing preconfiguration.

Step 202. The first terminal device plays an animation effect.

An AR marker is embedded in the animation effect played by the first terminal device.

Step 203. The second terminal device scans the AR marker embedded in an animation of the first terminal device.

For example, the second terminal device scans, by using the camera, the AR marker embedded in the animation of the first terminal device.

Step 204. The second terminal device plays an AR effect.

For example, the second terminal device triggers execution of the AR effect based on the AR marker. An AR marker is provided on the first terminal device, and a quantity of and a type of AR marker are not fixed. The AR marker is used to wake up the AR animation of the second terminal device side, and manufacture and develop an AR effect corresponding to each AR marker, where the AR effect is commonly an AR animation, a 3D effect, or the like.

Specifically, an AR marker may be provided to a user by using a web page, for example, an HTML 5 page, so that the user may identify the AR marker. A method for identifying the AR marker is not limited. For example, a common method is scanning, photographing, or touch-and-hold identification. The user identifies that the AR effect is triggered by the AR marker, where the AR effect is commonly an animation meeting a real time scene or having an interaction with a real time scene, so that the interaction between the screen of the first terminal device and the screen of the second terminal device may be implemented.

Step 205. The second terminal device determines whether the AR effect is the final AR effect.

If there is a plurality of AR effects that need to be processed, step 1 to step 5 may need to be performed again. After the second terminal device determines that the final AR effect is executed, the whole process ends.

It may be learned from the foregoing examples that, in this embodiment of the present disclosure, good interactivity, AR scanning of a plurality of AR markers, and trigger/presentation/redirection of an animation may be implemented, and more user interaction methods may be provided. Novel user experience is implemented, the multi-screen interaction system having the plurality of AR markers provide space for selecting more interaction methods in each link and step, and double-screen effect experience is more novel. It is noted that the first terminal device and the second terminal device may have a synchronous playback effect, or may have an asynchronous playback effect. This depends on design of a product side, and is not limited herein.

It is noted that, to make the description brief, the foregoing method embodiments are expressed as a combination of a series of actions. However, persons skilled in the art appreciate that the present disclosure is not limited to the described action sequence, because according to the present disclosure, some steps may be performed in other sequences or performed simultaneously. In addition, persons skilled in the art also know that all the embodiments described in this specification are exemplary embodiments, and the related actions and modules are not needed in the present disclosure.

To better implement the foregoing solutions in the embodiments of the present disclosure, the following further provides related apparatuses configured to implement the foregoing solutions.

Figure 3:
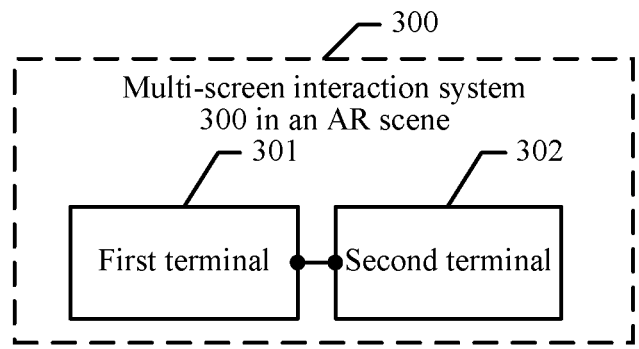
FIG. 3 is a schematic structural diagram of a multi-screen interaction system in an AR scene according to an embodiment of the present disclosure.

Referring to FIG. 3, a multi-screen interaction system 300 in an AR scene provided in an embodiment of the present disclosure may include a first terminal device 301 and a second terminal device 302 between which a communication connection established, where the first terminal device 301 is configured to display a resource object in the AR scene, where an AR marker is embedded in the resource object; and the second terminal device 302 is configured to: capture, from the first terminal device 301 through the communication connection in a process that the first terminal device 301 displays the resource object, the AR marker embedded in the resource object, and display an AR effect in the AR scene based on the AR marker.

In some embodiments of the present disclosure, the first terminal device 301 is specifically configured to: run an APP, to display the resource object embedded with the AR marker on a display interface of the APP; or display, by using a web page of a browser, the resource object embedded with the AR marker.

In some embodiments of the present disclosure, the second terminal device 302 is specifically configured to scan or photograph a display screen of the first terminal device 301 by using a camera, to capture the AR marker embedded in the resource object.

In some embodiments of the present disclosure, the second terminal device 302 is specifically configured to: obtain a touch-and-hold identification request sent after a display screen of the first terminal device 301 is touched; receive the touch-and-hold identification request through the communication connection, and capture the AR marker embedded in the resource object from the display screen of the first terminal device 301 based on the touch-and-hold identification request.

In some embodiments of the present disclosure, the second terminal device 302 is further configured to send an AR effect play message to the first terminal device 301 through the communication connection; and the first terminal device 301 is further configured to: obtain the AR effect play message of the second terminal device 302 through the communication connection; and display, based on the AR effect play message of the second terminal device 302, an AR resource associated with the AR effect.

In some embodiments of the present disclosure, the first terminal device 301 and the second terminal device 302 communicate with each other by using a long connection signal or a polling signal.

In some embodiments of the present disclosure, the second terminal device is specifically configured to: obtain the AR resource based on the AR marker; and display an AR effect corresponding to the AR resource on a screen of the second terminal device.

It may be learned from descriptions of the foregoing embodiment of the present disclosure that, the multi-screen interaction system in an AR scene includes the first terminal device and the second terminal device between which a communication connection is established. The first terminal device embeds an AR marker in a resource object, and the AR marker is displayed on a screen of the first terminal device. In a process that the first terminal device displays the resource object, the second terminal device captures the AR marker embedded in the resource object from the first terminal device through the communication connection, so that the second terminal device displays an AR effect in the AR scene based on the AR marker. In this embodiment of the present disclosure, the AR effect displayed on the second terminal device is triggered by the AR marker displayed in the first terminal device. Therefore, in this embodiment of the present disclosure, a multi-screen interaction between the screen of the first terminal device and a screen of the second terminal device can be implemented, satisfying a request of a user on the multi-screen interaction in the AR scene.

Figure 4:
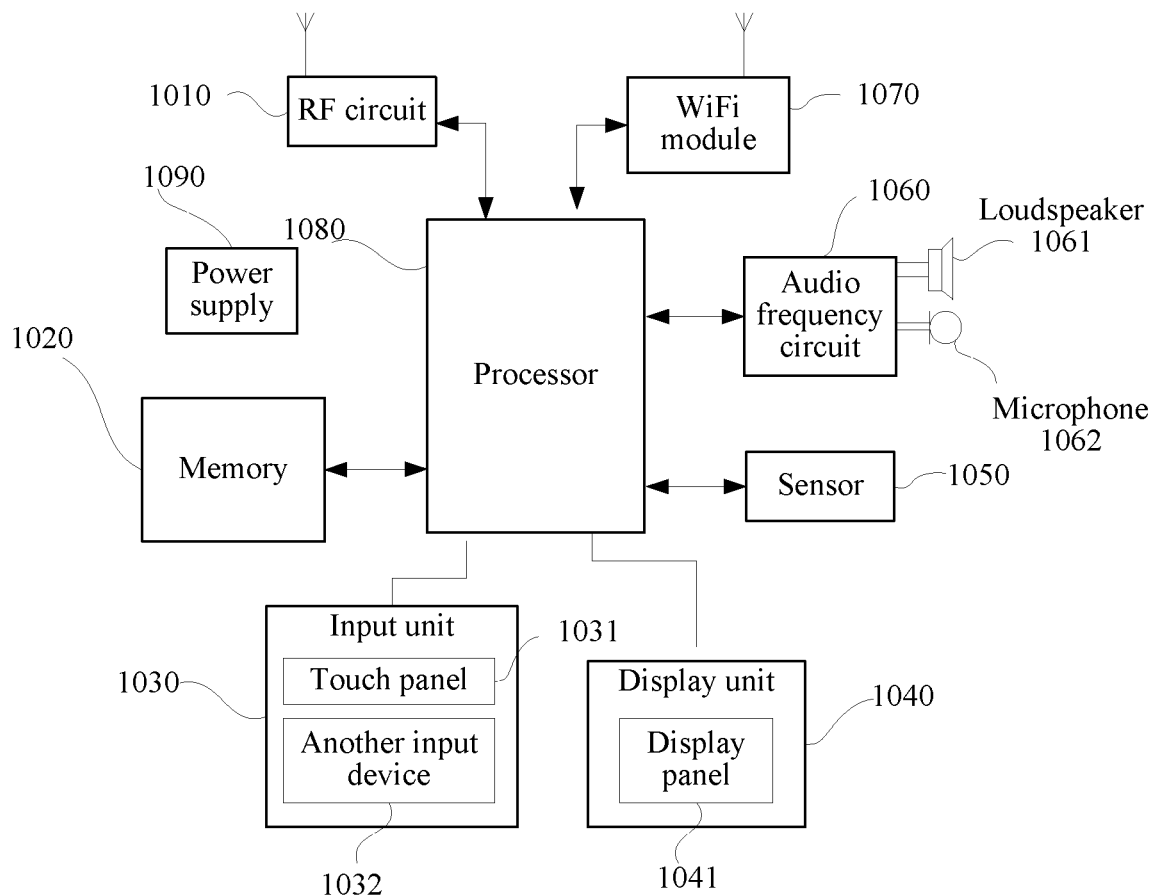
FIG. 4 is a schematic structural diagram of a first terminal device or a second terminal device in a multi-screen interaction method in an AR scene according to an embodiment of the present disclosure.

An embodiment of the present disclosure further provides another terminal device. The terminal device may be the first terminal device described in the foregoing embodiments, or the terminal device may be the second terminal device described in the foregoing embodiments. As shown in FIG. 4, for convenience of description, a part related to this embodiment of the present disclosure is shown. For technical details not disclosed, refer to the method in the embodiments of the present disclosure. The terminal device may be any terminal device including a mobile phone, a tablet computer, a personal digital assistant (PDA), a point of sales (POS), and an on-board computer, and the terminal device being a mobile phone is used as an example.

FIG. 4 is a block diagram of a structure of a part of a mobile phone related to a terminal device according to an embodiment of the present disclosure. Referring to FIG. 4, the mobile phone includes components such as a radio frequency (RF) circuit 1010, a memory 1020, an input unit 1030, a display unit 1040, a sensor 1050, an audio frequency circuit 1060, a Wireless Fidelity (WiFi) module 1070, a processor 1080, and a power supply 1090. Persons skilled in the art may understand that the structure of the mobile phone shown in FIG. 4 does not constitute a limitation to the mobile phone, and the mobile phone may include more components or fewer components than those shown in the figure, or some components may be combined, or a different component deployment may be used.

The following specifically describes the components of the mobile phone with reference to FIG. 4.

The RF circuit 1010 may be configured to receive and send a signal during an information receiving and sending process or a call process. Specifically, the RF circuit 1010 receives downlink information from a base station, then delivers the downlink information to the processor 1080 for processing, and sends designed uplink data to the base station. Generally, the RF circuit 1010 includes, but is not limited to, an antenna, at least one amplifier, a transceiver, a coupler, a low noise amplifier (LNA), and a duplexer. In addition, the RF circuit 1010 may also communicate with a network and another device by means of wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), email, Short Message Service (SMS), and the like.

The memory 1020 may be configured to store a software program and module. The processor 1080 runs the software program and module stored in the memory 1020, to implement various functional applications and data processing of the mobile phone. The memory 1020 may mainly include a program storage area and a data storage area. The program storage area may store an operating system, an application program needed by at least one function (such as a sound playback function and an image playback function), and the like. The data storage area may store data (such as audio data and an address book) created based on use of the mobile phone, and the like. In addition, the memory 1020 may include a high speed random access memory, and may further include a non-volatile memory, such as at least one magnetic disk storage device, a flash memory, or another volatile solid-state storage device.

The input unit 1030 may be configured to receive input digit or character information, and generate a key signal input related to the user setting and function control of the mobile phone. Specifically, the input unit 1030 may include a touch panel 1031 and another input device 1032. The touch panel 1031, which may also be referred to as a touchscreen, may collect a touch operation of a user on or near the touch panel 1031 (such as an operation of a user on or near the touch panel 1031 by using any suitable object or accessory such as a finger or a stylus), and drive a corresponding connection apparatus according to a preset program. Optionally, the touch panel 1031 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 1080. Moreover, the touch controller can receive and execute a command sent from the processor 1080. In addition, the touch panel 1031 may be a resistive, capacitive, infrared, surface sound wave type touch panel, or the like. In addition to the touch panel 1031, the input unit 1030 may further include the another input device 1032. Specifically, the another input device 1032 may include, but is not limited to: one or more of a physical keyboard, a functional key (such as a volume control key or a switch key), a trackball, a mouse, and a joystick.

The display unit 1040 may be configured to display information input by the user or information provided for the user, and various menus of the mobile phone. The display unit 1040 may include a display panel 1041. Optionally, the display panel 1041 may be configured by using a liquid crystal display (LCD), an organic light-emitting diode (OLED), or the like. Further, the touch panel 1031 may cover the display panel 1041. After detecting a touch operation on or near the touch panel 1031, the touch panel 131 transfers the touch operation to the processor 1080, to determine a type of a touch event. The processor 1080 then provides a corresponding visual output on the display panel 1041 based on the type of the touch event. Although, in FIG. 4, the touch panel 1031 and the display panel 1041 are used as two separate parts to implement input and output functions of the mobile phone, in some embodiments, the touch panel 1031 and the display panel 1041 may be integrated to implement the input and output functions of the mobile phone.

The mobile phone may further include at least one sensor 1050 such as an optical sensor, a motion sensor, and another sensor. Specifically, the optical sensor may include an ambient light sensor and a proximity sensor. The ambient light sensor may adjust luminance of the display panel 1041 based on brightness of the ambient light. The proximity sensor may switch off the display panel 1041 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio frequency circuit 1060, a loudspeaker 1061, and a microphone 1062 may provide audio interfaces between the user and the mobile phone. The audio frequency circuit 1060 may convert received audio data into an electric signal and transmit the electric signal to the loudspeaker 1061. The loudspeaker 1061 converts the electric signal into a sound signal for output. On the other hand, the microphone 1062 converts a collected sound signal into an electric signal. The audio frequency circuit 1060 receives the electric signal and converts the electric signal into audio data, and outputs the audio data to the processor 1080 for processing. Then, the processor 1080 sends the audio data to, for example, another mobile phone by using the RF circuit 1010, or outputs the audio data to the memory 1020 for further processing.

WiFi is a short distance wireless transmission technology. The mobile phone may help, by using the WiFi module 1070, the user to receive and send emails, browse a web page, access streaming media, and so on, which provides wireless broadband Internet access for the user. Although FIG. 4 shows the WiFi module 1070, it may be understood that the WiFi module 1070 is an optional component of the mobile phone, and when needed, the WiFi module 1070 may be omitted as long as the scope of the essence of the present disclosure is not changed.

The processor 1080 is the control center of the mobile phone, and is connected to various parts of the mobile phone by using various interfaces and lines. By running or executing the software program and/or module stored in the memory 1020, and invoking data stored in the memory 1020, the processor 1080 performs various functions of the mobile phone and processes data, thereby performing overall monitoring on the mobile phone. Optionally, the processor 1080 may include one or more processing units. Preferably, the processor 1080 may integrate an application processor and a modem processor. The application processor mainly processes an operating system, a user interface, an application program, and the like. The modem processor mainly processes wireless communication. It may be understood that the foregoing modem processor may alternatively not be integrated into the processor 1080.

The mobile phone further includes the power supply 1090 (such as a battery) for supplying power to the components. Preferably, the power supply may be logically connected to the processor 1080 by using a power management system, thereby implementing functions such as charging, discharging and power consumption management by using the power management system.

Although not shown in the figure, the mobile phone may further include a camera, a Bluetooth module, and the like, which are not further described herein.

In this embodiment of the present disclosure, the processor 1080 included in the terminal device may control and perform the foregoing multi-screen interaction method process performed by the first terminal device, or the processor 1080 included in the terminal device may control and perform the foregoing multi-screen interaction method process performed by the second terminal device. For the multi-screen interaction method process performed by the first terminal device and the second terminal device, refer to the descriptions in the foregoing embodiments.

In addition, it is noted that the apparatus embodiment described above is merely schematic. Units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. In addition, in the accompanying drawings of the apparatus embodiments of the present disclosure, a connection relationship between modules represent that they have a communication connection. Specifically, the connection relationship may be implemented by using one or more communications buses or signal cables. A person of ordinary skill in the art may understand and implement this application in related technology.

Through the descriptions of the foregoing implementation, persons skilled in the art may clearly understand that the present disclosure may be implemented by using software and a universal hardware platform. Certainly, the present disclosure may alternatively be implemented by using dedicated hardware such as an application-specific integrated circuit, a dedicated CPU, a dedicated memory, or a dedicated element. Generally, any function executed by using a computer program may be easily implemented by using corresponding hardware. Moreover, a specific hardware structure used to implement a same function may be various, for example, an analog circuit, a digital circuit, or a private circuit. However, for the present disclosure, using a software program for implementation is preferable. Based on such an understanding, the technical solutions of the present disclosure or the part that makes contributions to the related technology can be substantially embodied in the form of a software product. The computer software product is stored in a readable storage medium, for example, a floppy disk, a USB flash disk, a removable hard disk, a read-only memory (ROM), a random access memory (RAM), a magnetic disk, or an optical disc of the computer, and includes several instructions used to instruct a computer device (which may be a personal computer, a server, a network device, or the like) to perform the methods according to the embodiments of the present disclosure.

In conclusion, the foregoing embodiments are merely intended for describing the technical solutions of the present disclosure, but not for limiting the present disclosure. Although the present disclosure is described in detail with reference to the foregoing embodiments, persons of ordinary skill in the art understand that they may still make modifications to the technical solutions described in the foregoing embodiments or make equivalent replacements to some technical features thereof, without departing from the spirit and scope of the technical solutions of the embodiments of the present disclosure.

It is noted that the various modules, submodules, units, subunits, and components in the present disclosure can be implemented using any suitable technology. For example, a module or a unit can be implemented using processing circuitry. In an example, a module or a unit can be implemented using integrated circuit (IC). In another example, a module or a unit can be implemented as a processor executing software instruction. In another example, interface circuitry is used to implement receiving unit (or module) and/or sending unit (or module).

What is claimed is:

1. A multi-screen interaction method for a multi-screen interaction system for an augmented reality scene, the method comprising:
   displaying, by processing circuitry of a first device of the multi-screen interaction system for the augmented reality scene, a resource object of the augmented reality scene, in which an augmented reality marker is embedded;
   receiving, by the processing circuitry of the first device, an augmented reality effect play message from a second device of the multi-screen interaction system for the augmented reality scene through a communication connection; and
   displaying, by the processing circuitry of the first device, an augmented reality resource associated with the augmented reality effect play message in response to the received augmented reality effect play message, wherein
   the augmented reality resource is displayed by the processing circuitry of the first device concurrently with an augmented reality effect displayed by the second device.

2. The method of claim 1, wherein the displaying the resource object of the augmented reality scene comprises:
   using, by the processing circuitry of the first device, one of an application and a web page of a browser to display the resource object of the augmented reality scene, in which the augmented reality marker is embedded.

3. The method of claim 1, further comprising:
   sending, by the processing circuitry of the first device, a touch-and-hold identification request through the communication connection to the second device after a display screen of the first device is touched.

4. The method of claim 3, further comprising:
   receiving, by the processing circuitry of the second device of the multi-screen interaction system for the augmented reality scene, the touch-and-hold identification request from the first device through the communication connection after the display screen of the first device is touched; and
   capturing, by the processing circuitry of the second device, the augmented reality marker embedded in the resource object from the display screen of the first device when the touch-and-hold identification request is received.

5. The method of claim 4, further comprising:
sending, by the processing circuitry of the second device, the augmented reality effect play message to the first device through the communication connection.

6. The method of claim 4, further comprising:
obtaining, by the processing circuitry of the second device, the augmented reality resource corresponding to the augmented reality marker; and
displaying, by the processing circuitry of the second device, the augmented reality effect corresponding to the augmented reality resource on a display screen of the second device.

7. The method of claim 1, further comprising:
using a camera, by the processing circuitry of the second device of the multi-screen interaction system for the augmented reality scene, to scan or photograph a display screen of the first device, to capture the augmented reality marker embedded in the resource object from the first device.

8. The method of claim 7, further comprising:
sending, by the processing circuitry of the second device, the augmented reality effect play message to the first device through the communication connection.

9. The method of claim 7, further comprising:
obtaining, by the processing circuitry of the second device, the augmented reality resource corresponding to the augmented reality marker; and
displaying, by the processing circuitry of the second device, the augmented reality effect corresponding to the augmented reality resource on a display screen of the second device.

10. A device for interacting with a second device for a multi-screen interaction system for an augmented reality scene, the device comprising:
interface circuitry configured to transmit and receive signals carrying media data to and from the second device through a communication connection; and
processing circuitry configured to:
display a resource object of the augmented reality scene, in which an augmented reality marker is embedded;
receive an augmented reality effect play message corresponding to augmented reality marker from the second device through the communication connection; and
display an augmented reality resource associated with the augmented reality effect play message in response to the received augmented reality effect play message, wherein
the augmented reality resource is displayed by the processing circuitry of the device concurrently with an augmented reality effect displayed by the second device.

11. The device of claim 10, wherein the augmented reality marker causes the second device to display the augmented reality effect of the augmented reality scene corresponding to the augmented reality resource when the augmented reality marker is captured by the second device from the displayed resource object.

12. The device of claim 10, wherein the processing circuitry is configured to use one of an application or a web page of a browser to display the resource object of the augmented reality scene, in which the augmented reality marker is embedded.

13. The device of claim 10, wherein the processing circuitry is further configured to:
send a touch-and-hold identification request to the second device through the communication connection when a display screen of the device is touched.

14. The device of claim 13, wherein the augmented reality marker embedded in the resource object from the display screen of the device is captured by the second device when the touch-and-hold identification request is received by the second device through the communication connection.

15. The device of claim 14, wherein the augmented reality effect play message is sent by the second device through the communication connection to the device when the second device obtains the augmented reality resource corresponding to the augmented reality marker.

16. The device of claim 10, wherein the augmented reality marker embedded in the resource object from a display screen of the device is captured by the second device by using a camera to scan or photograph the display screen of the device.

17. The device of claim 16, wherein the augmented reality effect play message is sent by the second device through the communication connection to the device when the second device obtains the augmented reality resource corresponding to the augmented reality marker.

18. The device of claim 10, wherein the second device is an augmented reality head-mounted device.

19. The device of claim 10, wherein a display screen of the device or a display screen of the second device is a touch screen.

20. A non-transitory computer-readable storage medium storing instructions which when executed by at least one processor of a first device cause the at least one processor to perform:
displaying a resource object of an augmented reality scene, in which an augmented reality marker is embedded;
receiving an augmented reality effect play message from a second device of a multi-screen interaction system for the augmented reality scene through a communication connection; and
displaying an augmented reality resource associated with the augmented reality effect play message in response to the received augmented reality effect play message, wherein
the augmented reality resource is displayed by the first device concurrently with an augmented reality effect displayed by the second device.

* * * * *